UNITED STATES PATENT OFFICE.

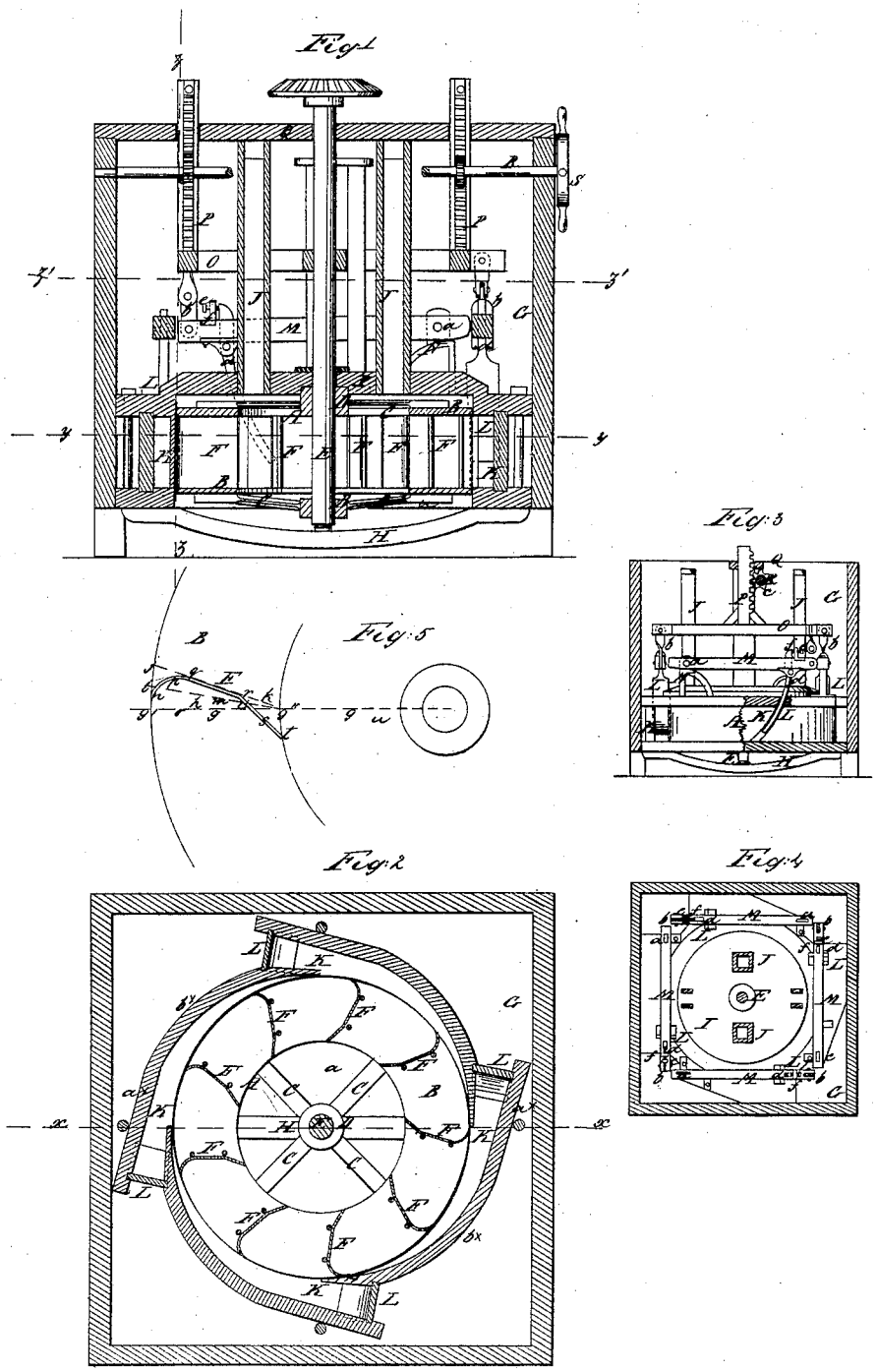

JOHN McCARTY, OF CATHARINE, NEW YORK.

HORIZONTAL WATER-WHEEL.

Specification of Letters Patent No. 20,437, dated June 1, 1858.

*To all whom it may concern:*

Be it known that I, JOHN McCARTY, of Catharine, in the county of Schuyler and State of New York, have invented a new and Improved Horizontal Center-Vent Water-Wheel; and I do hereby declare that the following is a full, clear, and exact description of the same, reference being had to the annexed drawings, making a part of this specification, in which—

Figure 1, is a vertical section of my improvement, taken in the line $x$, $x$, Fig. 2. Fig. 2 is a horizontal section of ditto taken in the line $y$, $y$, Fig. 1. Fig. 3 is a reduced vertical section of ditto, taken in the line $z$, $z$, Fig. 1. Fig. 4 is a reduced horizontal section of ditto taken in the line $z'$, $z'$, Fig. 1. Fig. 5 is a diagram showing the manner in which the buckets are formed.

Similar letters of reference indicate corresponding parts in the several figures.

My invention consists, first, in a peculiar form of bucket.

My invention consists, second, in the employment or use of four chutes arranged relatively with the buckets and wheel, as will be presently described.

My invention consists, third, in the peculiar arrangement of the gates, and the mode of operating the same, as will be hereinafter fully shown and described.

To enable those skilled in the art to fully understand and construct my invention I will proceed to describe it.

A represents the wheel which is formed of two rims B, B, connected by arms C, with hubs D, which are keyed or secured to the shaft E, the two rims being secured at a proper distance apart.

F represents the buckets which are placed and firmly secured between the two rims B, B. The rims B are made of a suitable width according to the desired length of the buckets.

The wheel is fitted within a pen-stock G, and the lower end of the shaft E is stepped in a cross-bar H attached to the bottom of the pen-stock G, as shown clearly in Figs. 1 and 2. The wheel is covered by a plate I, and the lower ends of vertical air-tubes J pass through the plate I, said tubes extending up above the surface of the water in pen-stock G. The lower or under surface of the wheel is exposed.

K, K, K, K, are four chutes which conduct the water to the wheel. At the outer end of each chute a gate L is placed. The sides or edges of these gates work in grooves made in the inner sides of the chutes. The gates are of curved form as shown clearly in Fig. 2, and the upper end of each gate is attached to a lever M, which are pivoted at one end to uprights N as shown at, $a$. The levers M are attached by straps or links, $b$, to a rectangular frame O which has vertical racks P, P, attached, said racks passing through a cross-piece Q on the upper end of the pen-stock. A shaft R passes through the upper end of the pen-stock, said shaft having two pinions, $c$, $c$, upon it which pinions gear into the racks P, P. The shaft R has a hand-wheel S at one end. By turning the hand-wheel S the four gates may be all raised and lowered simultaneously.

The gates L have each a shank, $d$, formed on their upper ends, and these shanks pass through mortises in the levers M and are pivoted in said mortises and allowed a certain degree of play or vibration therein, the play or vibration being regulated by set screws, $e$, which pass through ledges or plates, $f$, on the levers M. By having the gates L of curved form attached to the levers M as shown, and allowed a requisite degree of play, the gates are allowed to work with but little friction, and by connecting them to the frame O as shown, they may all be adjusted simultaneously and kept in a corresponding position relatively with each other so that an equal volume of water will pass through each.

The buckets F are formed as follows: The rims B, B of the wheel are divided into a certain number of parts corresponding to the number of buckets required. Radial lines, $g$, are then drawn from the centers of the rims to their peripheries, the lines $g$, passing through the points, $g'$, $g''$, or divisions on the rims, see Fig. 5 in which a portion of one rim and one bucket are represented. The line, $g$, is divided by the points, $h$, $i$, into three parts; and a point, $j$, is made on the outer periphery of the rim B, the points, $j$, and $h$, being equi-distant from $g'$. A line, $k$, is then drawn from the point, $j$, to the point, $g''$, at the inner periphery of the rim. A point, $l$, is then made equi-distant between the points $g'$, and, $j$, and a line, $m$, is drawn from, $l$, to $g''$. From the point, $h$, as a center, a segment or portion of a circle, $n$, is drawn; said segment extending from the point, $g'$, to the line, $m$. A point, $o$, is then made on the line, $g$, between the points, $h$, and $g'$, the point, $o$, being one-third the distance from point, $h$; and, from $o$, as a center, the segment, $p$, is drawn from the segment, $n$, at its point of intersection with line, $m$, to the line, $k$, the segment, $p$, intersecting the line, $k$, at $q$. From the point, $i$, on line, $g$, a line is drawn perpendicular to $k$, and intersecting it at the point, $r$, and from the point, $r$, a line, $s$, is drawn at about $22\frac{1}{2}°$ with the line, $k$, and intersecting the inner periphery of the rim B at, $t$. The two segments, $n$, $p$, the portion of the line, $k$, between the parts, $q$, $r$, and the line, $s$, show the lineal form of the bucket. By having the buckets constructed in this form the water is prevented from being discharged too quickly as the oblique inner ends, $s$, retard its passage to the vent, $u$, while the curved outer end formed of the segments, $n$, $p$, prevent the water from pressing laterally against the sides of the chutes, K, K, K, K. The water therefore will be retained by the buckets until its full, effective force has been expended against them and then will be discharged at the vent, $u$. The chutes K are formed of a tangent, $a^x$, and a curve, $b^x$, see Fig. 2. The curves, $b^x$, are slightly eccentric with the wheel or the rims B, so that the curves and tangents will form chutes of taper form gradually approaching the rims from their outer to their inner ends. This form of the chutes causes the water to act properly against the buckets, for the water is properly presented to them; and the four chutes, in consequence of conducting the water to opposite sides of the wheel, preserve its equilibrium.

I do not claim broadly the operating of all the gates simultaneously.

I am aware that many horizontal center-vent wheels have been devised, and I am also aware that four chutes have been employed to let the water on the wheel at opposite points of its shafts for the purpose of preserving the equilibrium of the wheel. I, therefore, do not claim separately the chutes K; nor do I claim broadly a center-vent or center discharge wheel, but

Having thus described my invention, what I claim as new and desire to secure by Letters Patent, is—

1. The buckets F constructed of the form specifically as herein shown and described for the purpose set forth.

2. I claim in combination with the buckets thus formed the four chutes K, arranged as shown and described.

3. I claim the manner of operating the gates L, the same being curved and attached to the levers M, as shown, and connecting the levers M with the rising and falling frame O, the parts being arranged as described for the purposes set forth.

JOHN McCARTY.

Witnesses:
CHAS. J. BROAS,
O. M. CLANHARTY.